United States Patent
Olsen et al.

(10) Patent No.: US 7,680,049 B2
(45) Date of Patent: Mar. 16, 2010

(54) METHODS AND APPARATUS FOR ALLOWING PROMOTION IN COLOR-BASED POLICERS

(75) Inventors: Robert Olsen, Dublin, CA (US); Clarence Filsfils, Brussels (BE); John Evans, Chiswick (GB)

(73) Assignee: Cisco Technology, Inc., San Jose, CA (US)

( * ) Notice: Subject to any disclaimer, the term of this patent is extended or adjusted under 35 U.S.C. 154(b) by 1149 days.

(21) Appl. No.: 11/054,091

(22) Filed: Feb. 8, 2005

(65) Prior Publication Data

US 2006/0176818 A1    Aug. 10, 2006

(51) Int. Cl.
*G01R 31/08* (2006.01)
(52) U.S. Cl. .............. 370/235.1; 370/230.1; 370/233; 370/234; 370/236
(58) Field of Classification Search ............ 370/235, 370/233, 234, 236, 230
See application file for complete search history.

(56) References Cited

U.S. PATENT DOCUMENTS

| | | | | |
|---|---|---|---|---|
| 5,274,644 A | * | 12/1993 | Berger et al. ............... | 370/230 |
| 5,596,576 A | * | 1/1997 | Milito ....................... | 370/450 |
| 6,748,435 B1 | * | 6/2004 | Wang et al. ................ | 709/225 |
| 6,781,956 B1 | * | 8/2004 | Cheung .................... | 370/235.1 |
| 6,901,052 B2 | * | 5/2005 | Buskirk et al. ............. | 370/235 |
| 6,914,883 B2 | * | 7/2005 | Dharanikota ............. | 370/230.1 |
| 2005/0078602 A1 | * | 4/2005 | Mancour et al. ........... | 370/230 |
| 2005/0120102 A1 | * | 6/2005 | Gandhi et al. .............. | 709/223 |
| 2005/0135378 A1 | * | 6/2005 | Rabie et al. ............. | 370/395.21 |

OTHER PUBLICATIONS

Heinanen et al., "A Two Rate Three Color Marker", Request for Comments RFC 2698, Sep. 1999, 5 pages.
Heinanen et al., "A Single Rate Three Color Marker" Request for Comments RFC 2697, Sep. 1999, 6 pages.

* cited by examiner

*Primary Examiner*—Daniel J Ryman
*Assistant Examiner*—Thinh D Tran
(74) *Attorney, Agent, or Firm*—Weaver Austin Villeneuve & Sampson LLP

(57) ABSTRACT

Methods and apparatus are provided for applying color based policing at a network node. Committed information rate (CIR) and peak information rate (PIR) buckets used to monitor transmission rates are augmented using CIR overflow and PIR overflow buckets. The CIR and PIR overflow buckets hold tokens provided to CIR and PIR buckets that exceed the associated burst limits. Based on the availability of tokens and the color associated with a received packet, an action can be applied to the packet that promotes the color associated with the packet.

30 Claims, 7 Drawing Sheets

METHODS AND APPARATUS FOR ALLOWING PROMOTION IN COLOR-BASED POLICERS

BACKGROUND OF THE INVENTION

1. Field of the Invention

The present invention generally relates to color based policing. In one example, techniques and mechanisms are provided to allow color based promotions upon determining traffic flow characteristics.

2. Description of Related Art

Conventional policers provide workable mechanisms for applying policy based forwarding. A color-aware policer specifies certain actions based on packet color and traffic flow characteristics. In one example, a color-aware two-rate two-burst policer as defined by RFC 2698 provides packet colors of green, yellow and red. Based on flow characteristics at a particular network node and the received color of the packet, an action such as conform, exceed, or violate action can be applied.

Each of these actions may specify different operations such as dropping the packet, forwarding the packet at high priority, or queuing the packet in a particular buffer. However, color based policers are limited. Color based policers are particularly limited in networks where traffic associated with different flows or subclasses are aggregated into a single flow or class. Color based policers often fail to optimally forward packets and apply forwarding policies because of indistinguishable flows and subclasses.

Consequently, it is therefore desirable to provide improved methods and apparatus for applying color based policing.

SUMMARY OF THE INVENTION

Methods and apparatus are provided for applying color based policing at a network node. Committed information rate (CIR) and peak information rate (PIR) buckets used to monitor transmission rates are augmented using CIR overflow and PIR overflow buckets. The CIR and PIR overflow buckets hold tokens provided to CIR and PIR buckets that exceed the associated burst limits. Based on the availability of tokens and the color associated with a received packet, an action can be applied to the packet that promotes the color associated with the packet.

In one embodiment, a method for policing traffic in a packet based network is provided. A packet associated with a stream is received at a router in the packet based network. A color associated with the packet is identified. The color corresponds to a policy applicable to the packet. The policy applicable to the packet is changed to an updated policy when it is determined that excess bandwidth associated with the stream is available.

In another embodiment, a router for policing traffic in a packet based network is provided. The router include an interface and a processor. The interface is configured to receive a packet associated with a stream. The processor is configured to identify a color associated with the packet, the color corresponding to a policy applicable to the packet. The processor is also configured to determine whether excess bandwidth associated with the stream is available and change the policy applicable to the packet to an updated policy when excess bandwidth associated with the stream is determined to be available.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Internet Protocol (IP) networks. However, it should be noted that the techniques of the present invention can be applied to variations to IP. In the following description, numerous specific details and examples are set forth in order to provide a thorough understanding of the present invention. The present invention may be practiced without some or all of these specific details and may or may not use the examples described. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Figure 1:
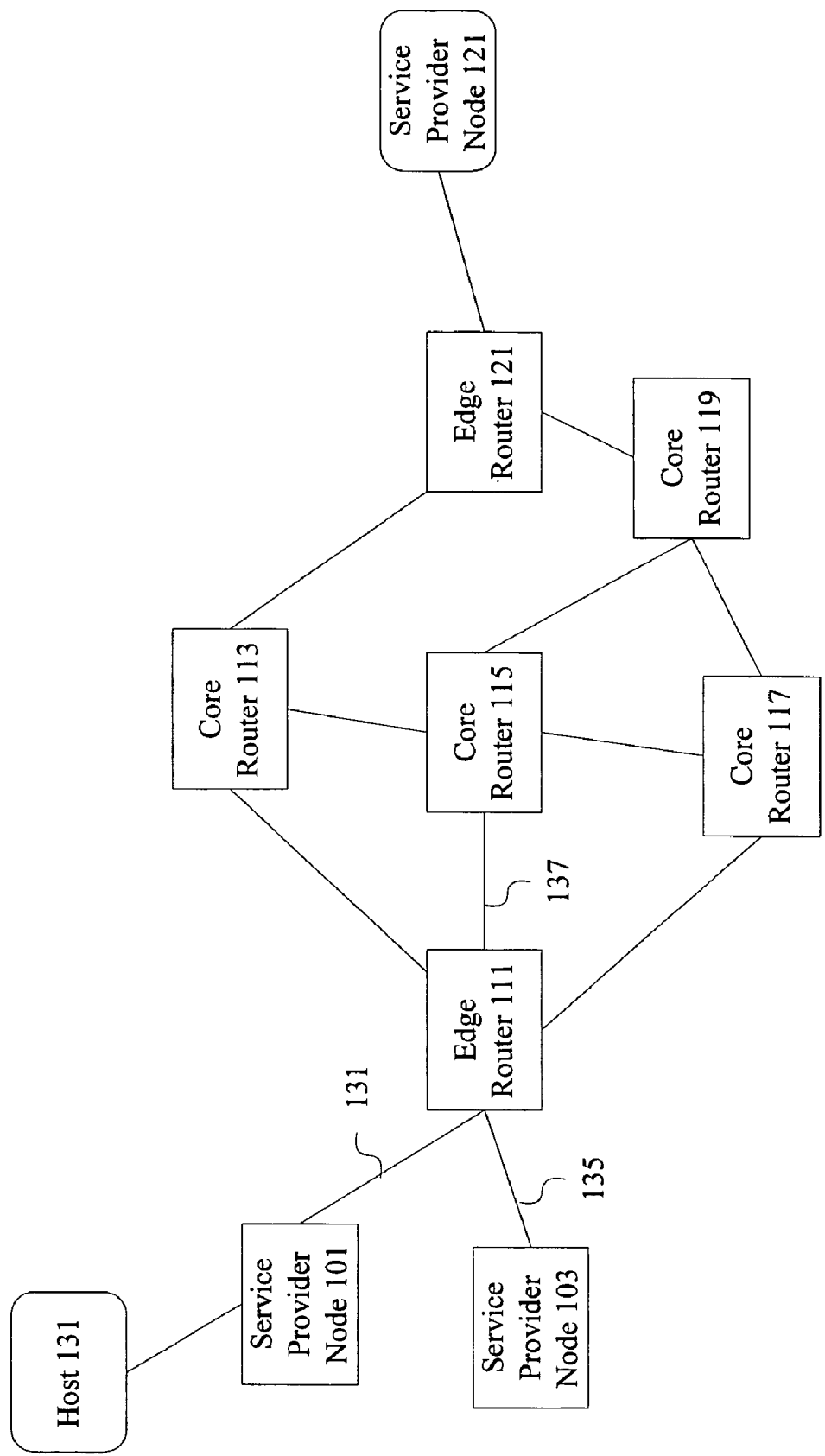
FIG. 1 is a diagrammatic representation showing one example of a network that can be used to implement the techniques of the present invention.

FIG. 1 is a diagrammatic representation of one example of a network that can use the techniques of the present invention. FIG. 1 shows one example of an Internet Protocol (IP) network. Although a particular network with particular network nodes is shown, it should be recognized that the techniques of the present invention can be implemented in a variety of networks and devices. According to various embodiments, the techniques and mechanisms of the present invention can be used at any network node capable of applying policy-based routing.

Policy-based routing (PBR) provides a mechanism for expressing and implementing forwarding/routing of data packets based on the policies defined by the network administrators. It provides a more flexible mechanism for routing packets through routers, complementing the existing mechanism provided by routing protocols. Policy-based routing includes quality of service (QoS), load sharing, etc.

According to various embodiments, policy-based routing can be implemented at edge routers 111 and 121, core routers 113, 115, 117, and 119, or service provider nodes 101, 103, and 121. In one example, policy-based routing is implemented at an edge router 111. One particular example of policy-based routing is a color-aware two-rate two-burst policer as described in RFC 2698. The color-aware two-rate two-burst policer can be used to monitor an IP packet stream. Packets are marked either green, yellow, or red and policies can be applied based on the color of the packet. In one example, a packet is marked red if it exceeds the Peak Information Rate (PIR). In one example, a packet marked red is dropped when it is received. In another example, it is marked either yellow or green depending on whether it exceeds the Committed Information Rate (CIR). Yellow or green packets when received can be forwarded using different levels of priority.

It should be noted that a variety of policers are available. In some examples, a three rate three burst policer can be applied that can mark its packets using one of four different colors. Furthermore, packets do not necessarily have to be marked using a physical color. In some examples, packets can be marked using a number indicating a policy level. Any mechanism indicating that a particular policy should be applied to a packet at a particular router is referred to herein as a color. In one example, the colors are green, yellow, and red, corresponding to conform, exceed, and violate policies to be applied to a packet.

The policer is configured by setting its mode and by assigning values to four traffic parameters: a Peak Information Rate (PIR) and its associated Peak Burst Size (PBS) and a Committed Information Rate (CIR) and its associated Committed Burst Size (CBS). According to various embodiments, the PIR and CIR are measured in bytes of IP packets per second. The PIR is equal to or greater than the CIR. The PBS and the CBS are measured in bytes and both of them are configured to be greater than 0. It is recommended that they be configured to be equal to or greater than the size of the largest possible IP packet in the stream. More information describing particular implementation details are found in RFC 2698 as noted above.

Figure 2:
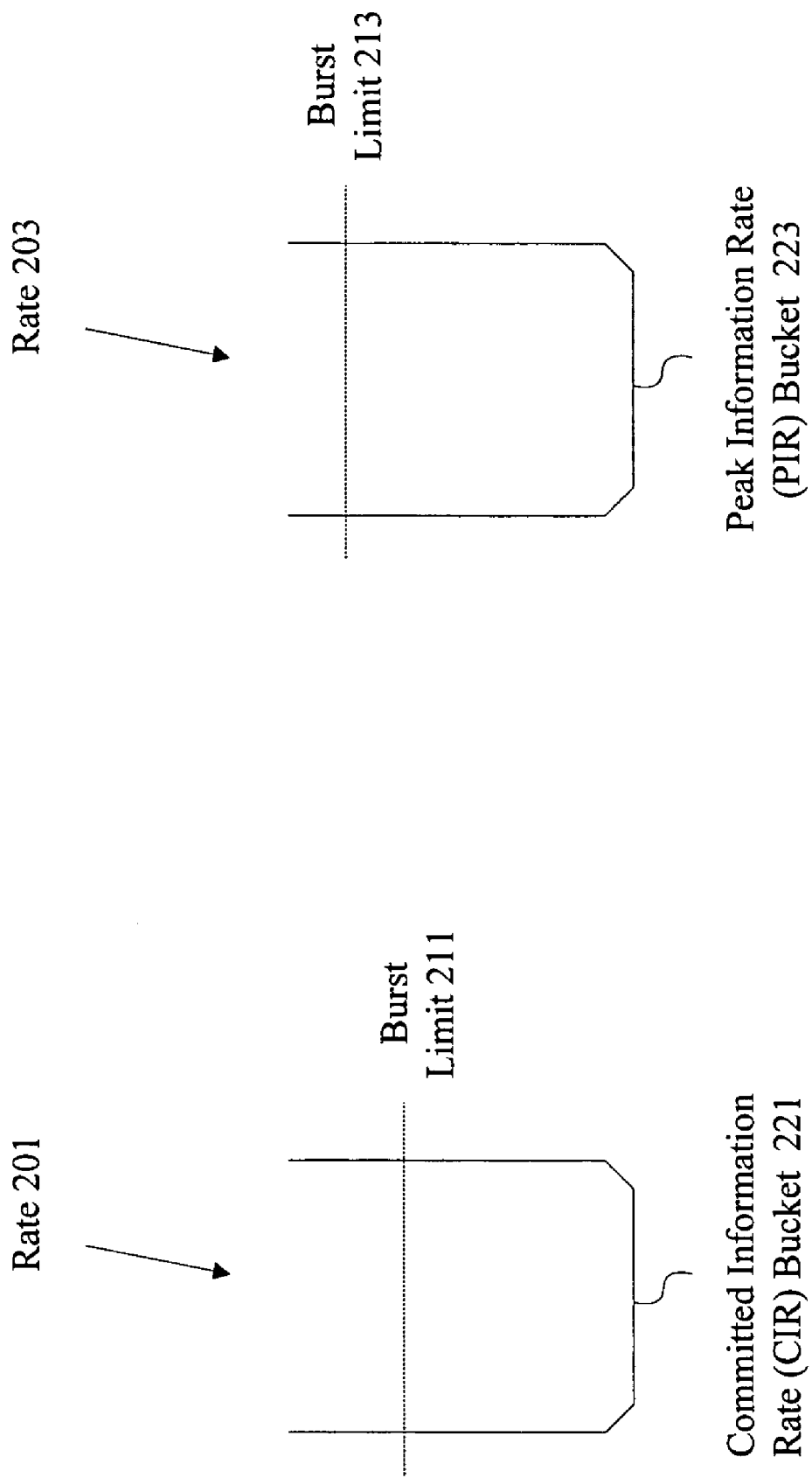
FIG. 2 is a diagrammatic representation showing a token bucket based policer.

FIG. 2 is a diagrammatic representation showing one particularly convenient way to implement a policer that involves the use of token buckets. It should be noted, however, that a variety of other mechanisms including meters, counters, and physical buffers can also be used. According to various embodiments, a policer includes a CIR bucket 221 that is filled with tokens at a rate 201 associated with the CIR. The CBS or burst limit 211 limits the number of tokens that can be included in the CIR bucket 221. The policer also includes a PIR bucket 223 that is filled with tokens at a rate 203 associated with the PIR. The PBS or burst limit 213 limits the number of tokens that can be included in the PIR bucket 221. According to various embodiments, buckets are provided on a per flow basis. Flows may be identified based on source and destination pairs or any variety of mechanisms configurable by a network administrator. For example, all traffic originating from particular servers may be included in a particular flow.

Figure 3:
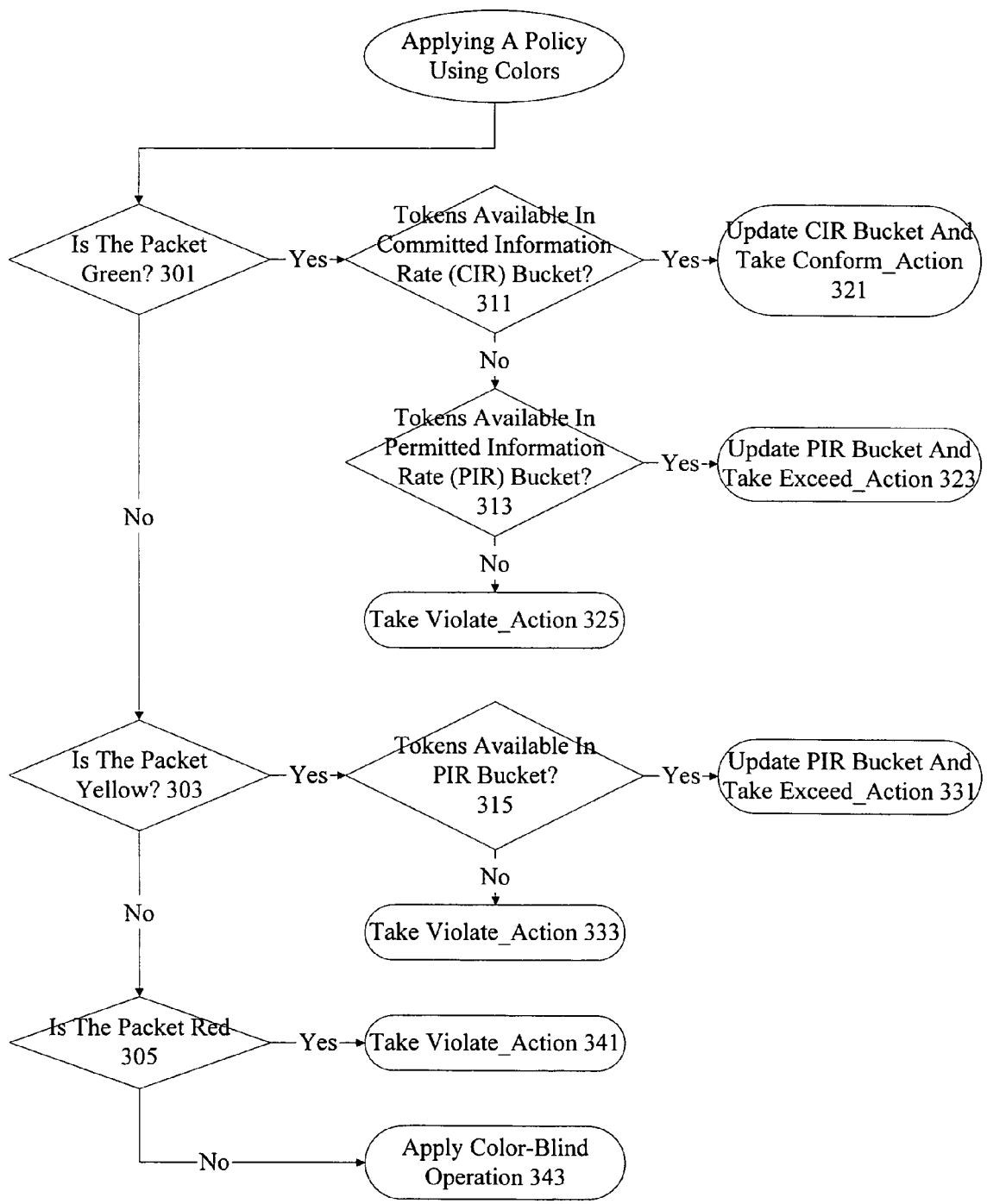
FIG. 3 is a flow process diagram showing a technique for policing traffic using colors.

FIG. 3 is a flow process diagram showing a technique for applying a policy using PIR and CIR buckets. According to various embodiments, when a packet is received, it is determined if the packet is green at 301. If the packet is green, it is determined if tokens are available in the CIR bucket at 311. It should be noted that the CIR bucket associated with the flow of the packet is checked. If tokens are available in the CIR bucket, the CIR bucket is updated and a conform action is taken at 321. Updating the CIR bucket may involve removing one or more tokens from the CIR bucket. In some embodiments, the PIR bucket is updated as well. According to various embodiments, a conform action can include immediately forwarding a packet or marking the packet as high priority for forwarding. In other examples, a conform action can include sending the packet to a high priority buffer.

If no tokens are available in the CIR bucket, it may mean that the flow is already being forwarded at a rate equal to or greater than the CIR. Consequently, it is determined if tokens are available in the PIR bucket at 313. If tokens are available in the PIR bucket, an exceed action is taken at 323. An exceed action may involve forwarding a packet in a low priority manner or forwarding the packet only when buffer space is available. If tokens are not available in the PIR bucket at 313, it may mean that the flow is already been forwarded at a rate equal to or greater than the PIR. Consequently, no additional packets can be transmitted at the particular time. A violate action is taken at 325. A violate action may include immediately dropping the packet.

If the packet is not green at 301, it is determined if the packet is yellow 303. If the packet is yellow 303, it is determined if tokens are available in the PIR bucket at 315. If tokens are available, the PIR bucket is updated and an exceed action is taken at 331. If no tokens are available in the PIR bucket, a violate action is taken at 333. If the packet is neither green nor yellow, it is determined if the packet is red at 305. If the packet is red, a violate action is taken at 341. If the packet is not red, colorblind operation is applied at 343. According to various embodiments colorblind operation may involves coloring certain colorless packets based on current forwarding rates.

It should be noted that the same techniques and mechanisms described for applying conform, exceed, and violate actions can be used to label or color a particular colorless packet. For example, a conform action can be used to color a colorless packet green while also applying other forwarding policies. The exceed action can be used to color a packet yellow. The violate action can be used to color a packet red.

Although a color aware policer such as that described in RFC 2698 provides a workable mechanism for applying policies while forwarding packets, conventional color aware policers are limited. For example, once a packet is labeled a particular color, only policies associated with that color and policies associated with any worse color can be applied. In one example, once a packet is labeled as a yellow packet, it can never be transmitted or forwarded using a conform action because a conform action can only be applied to green packets. This restriction may apply even if excess bandwidth is available to forward the old packet. Conventional mechanisms cannot allow promotion of a packet color from yellow to green or from red to yellow for example. Consequently, optimal policies are often not applied.

Figure 4:
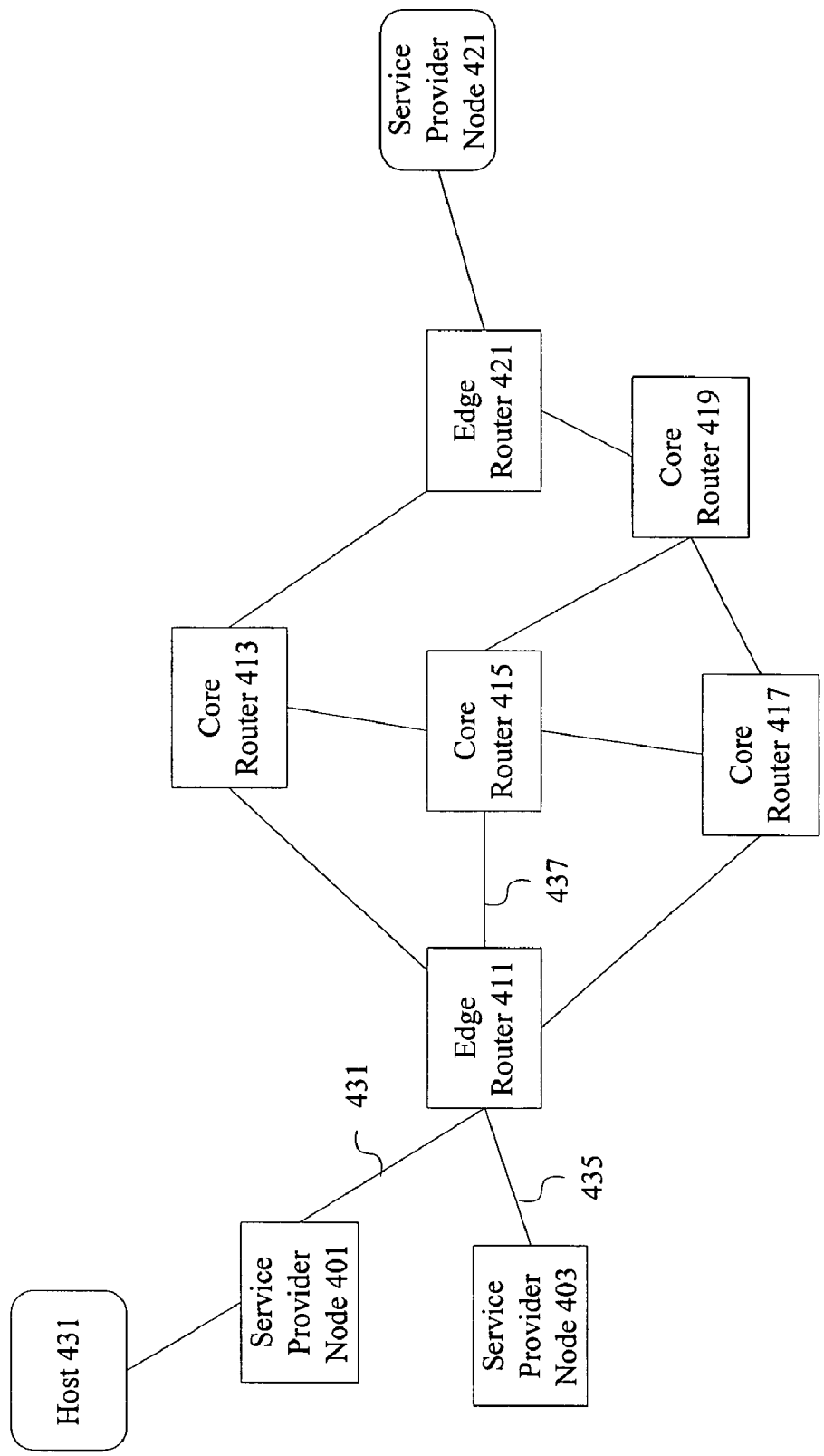
FIG. 4 is a diagrammatic representation depicting one scenario where packets could be promoted.

FIG. 4 is a diagrammatic representation showing one example of a system where color aware policers often fail to optimize forwarding. The core router 415 is connected to core router 413, edge router 411, and core routers 417 and 419. Edge router 421 is connected to core router 413 and core router 419 as well as service provider node 421 in a service provider network. Edge router 411 is connected to core router 413, core router 415, core router 417, and service provider nodes 401 and 403 in one or more service provider networks.

The host 431 is connected to service provider node 401. According to various embodiments, particular quality of service levels are configured on links 431 and 435 between edge router 411 and service provider nodes 401 and 403 respectively.

In one example, the CIR between the service provider node 401 and edge router 411 is configured as 10 MBps and the PIR is configured at 20 MBps. The CIR between the service provider node 403 and the edge router 411 is configured as 7 MBps and the PIR is configured at 14 MBps. The rates are aggregated on a link between edge router 411 and core router 415 and the CIR is set at 17 MBps and the PIR is set at 34 MBps. In one particular example, a service provider node 403 is transmitting on links 435 at a rate that exceeds the CIR but is within the PIR. Link 431 between service provider node 401 and edge router 411 is left relatively unused. Consequently, edge router 411 may receive a number of yellow packets from service provider node 403 as traffic on link 435 is being transmitted at a rate that exceeds the CIR.

However, when the edge router 411 transmits to core router 415, links 431 and 435 are aggregated to 437 and are no longer distinguishable. Consequently, edge router 411 believes that it can transmit using a CIR of 17 MBps and PIR of 34 MBps. Because little traffic is being transmitted along a link 431, link 437 has excess bandwidth to carry traffic from link 435. Consequently, in an optimal situation, packets received from link 435 colored either yellow or red should be promoted to the green or yellow color at edge router 411.

The scenario also occurs when traffic of multiple subclasses is aggregated into a single class of traffic for transmission over a network backbone or core network. According to various embodiments, a family of edge classes are aggregated in the backbone. For example, DataPremium1, DataPremium2, and DataPremium3 subclasses in a service provider network may be aggregated into a single DataPremium class at a core network. In one example, a service provider will define in the backbone that it accepts X Mbps of in-contract DataPremium traffic and Y Mbps of out-of-contract traffic. The service provider does not care how the X Mbps and Y Mbps are subdivided between the edge subclasses of the DataPremium Family. In some instances, the only thing that matters to the service provider is at the level of the class family, which corresponds to a single backbone class.

On the other side, the customer does have a strong requirement with respect to the behavior of these sub-classes in terms of 'Class Family traffic conditioning'. In one example, the aggregate class family 'DataPremium' is allocated 10 Mbps of In-contract and 10 Mbps of out-of-contract and the user splits this family into two edge subclasses with respective allocations of 6 Mbps of in-contract and 4 Mbps of out-of-contract.

In this example, the customer requires that the share of in-contract be respected when both subclasses are busy at the same time, and also requires as well that if one of the subclass of the family is idle, then the other subclasses of that family may reuse the unused in-contract rates (and obviously the out-contract rates as well).

The techniques of the present invention allow the ability to reuse bandwidth (in and out) between sub-classes of the same family when the conditioning rules are specified at the family level and there is desired weighted allocation at the sub-class level.

Figure 5:
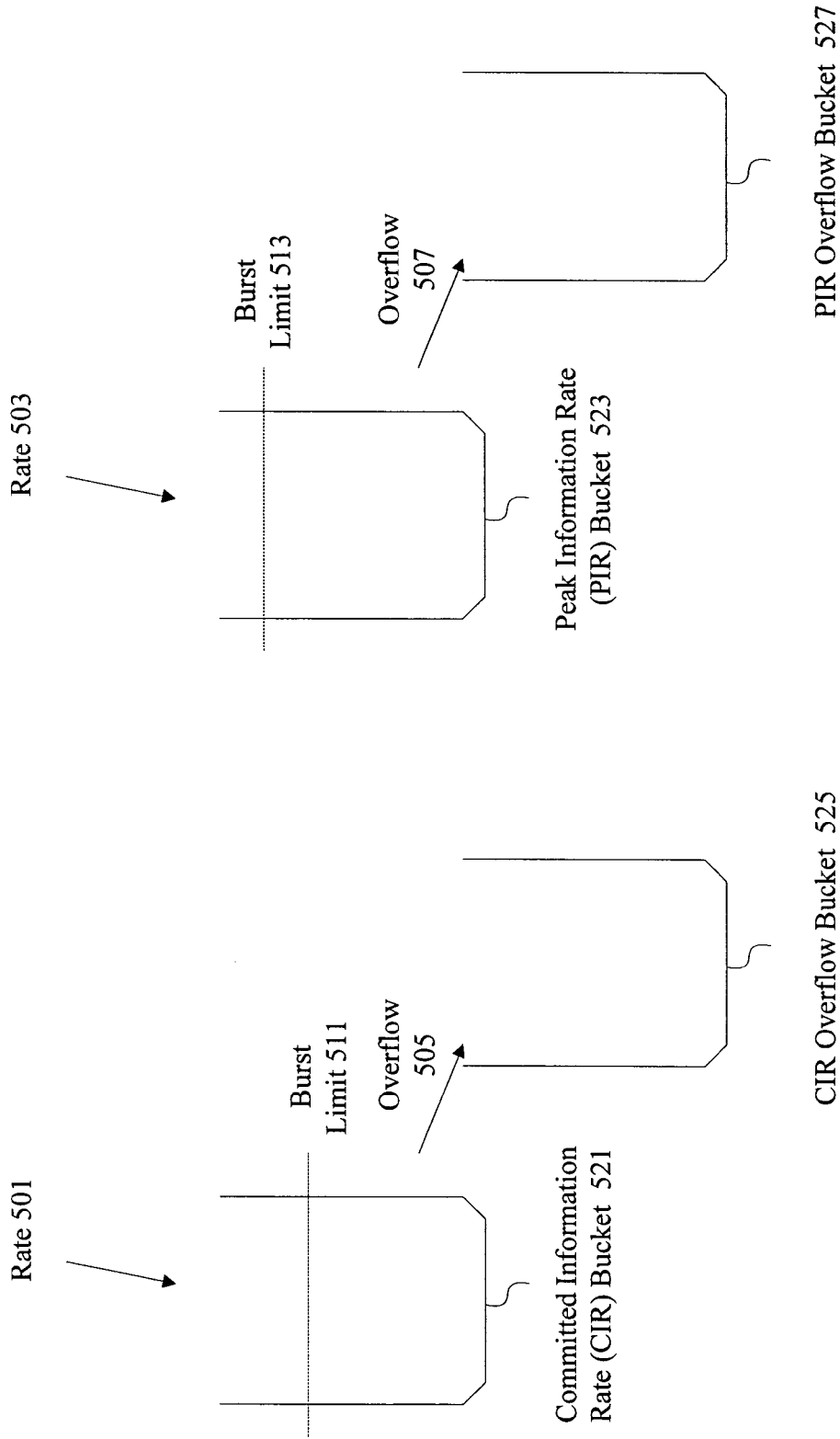
FIG. 5 is a diagrammatic representation showing a modified token bucket based policer.

FIG. 5 is a diagrammatic representation showing a modified policer using overflow buckets. According to various embodiments, a policer includes a CIR bucket 521 that is filled with tokens at a rate 501 associated with the CIR. The CBS or burst limit 511 limits the number of tokens that can be included in the CIR bucket 521. In typical implementations, when a burst limit 511 is reached, additional tokens are discarded. Techniques and mechanisms of the present invention provide a CIR overflow bucket 525 that allows excess tokens to be accumulated. In some examples, the CIR overflow bucket also includes a limit. Any mechanism used to track excess tokens from a CIR bucket is referred to herein as a CIR overflow bucket.

The policer also includes a PIR bucket 523 that is filled with tokens at a rate 503 associated with the PIR. The PBS or burst limit 513 limits the number of tokens that can be included in the PIR bucket 523. According to various embodiments, a PIR overflow bucket 527 allows excess tokens to be accumulated. In some examples, the PIR overflow bucket also includes a limit. Any mechanism used to track excess tokens from a PIR bucket is referred to herein as a PIR overflow bucket.

According to various embodiments, buckets are provided on a per flow basis. Flows may be identified based on source and destination pairs or any a variety of mechanisms configurable by a network administrator. For example, all traffic originating from particular servers or destined for particular types of devices may be included in a particular flow. The CIR and PIR overflow buckets 525 and 527 can be checked after respective CIR and PIR buckets are checked to allow for use of excess tokens.

Figure 6:
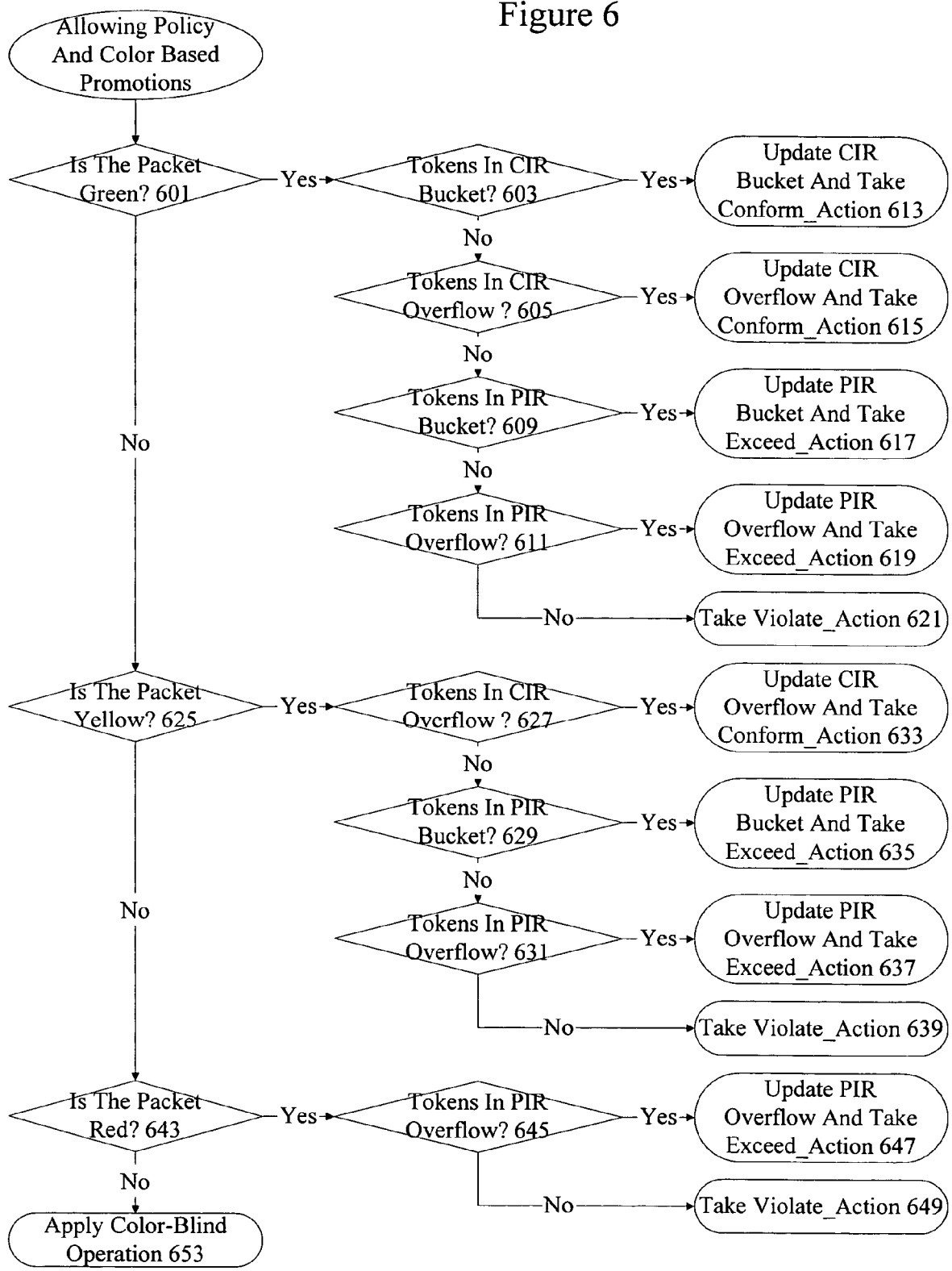
FIG. 6 is a flow process diagram showing a technique for allowing promotion using colors.

FIG. 6 is a flow process diagram showing one technique for allowing policy and color based promotions using overflow buckets. Any mechanism for improving the color indicator associated with a packet based on traffic flow is referred to herein as color based promotions or promotions. At 601, it is determined if a packet received is green. If the packet is green, it is determined if tokens are available in the CIR bucket at 603. If tokens are available in the CIR bucket at 603, a conform action is taken at 613 and the CIR bucket is updated. If tokens are not available in the CIR bucket at 603, it is determined if tokens are available in the CIR overflow bucket at 605.

In conventional implementations, no overflow buckets are checked. However, the techniques of the present invention provide overflow buckets to accumulate excess credits. If tokens are available in the CIR overflow bucket at 605, a conform action is taken at 615 and the CIR overflow bucket is updated. It should be noted that the conform action may involve any number of network administrator configurable actions. In one example, a conform action involves forwarding the packet at a high priority level and setting the packet color to green.

If no tokens are available in the CIR overflow bucket at 605, it is determined if tokens are available in the PIR bucket at 609. If tokens are available in the PIR bucket, the PIR bucket is updated and an exceed action is taken at 617. If no tokens are available in the PIR bucket, it is determined if tokens are available in the PIR overflow bucket 611. If tokens are available in the PIR overflow bucket, the PIR overflow bucket is updated and an exceed action is taken at 619. Otherwise, a violate action is taken at 621. Using overflow buckets when it is determined the packet is green allows a second chance transmission using conform or exceed actions.

If the packet is not green at 601, it is determined if the packet is yellow at 625. If the packet is yellow, it is first determined if there are tokens in the CIR overflow bucket at 627. If tokens are available in the CIR overflow bucket 627, the CIR overflow bucket is updated and a conform action is taken at 633. It should be noted that the conform action may involve setting a packet color to green. In this instance, a packet that is yellow is now set to green, in essence promoting the packet to allow more preferential policy based treatment. In conventional implementations, no CIR bucket or CIR overflow buckets is checked if the packet is yellow. However, the techniques and mechanisms of the present invention determine if any tokens are available in a CIR overflow bucket if the packet is yellow to allow for use of excess packets accumulated at a CIR.

If no tokens are available in the CIR overflow bucket at 627, it is determined if tokens are available in the PIR bucket at 629. If tokens are available in the PIR bucket at 629, the PIR bucket is updated and an exceed action is taken at 635. An exceed action may involve transmitting or forwarding packets at a lower priority and ensuring that the packet is now colored yellow. If no tokens are available in the PIR bucket at 629, it is determined if tokens are available in the PIR overflow bucket at 631. If tokens are available in the PIR overflow bucket, the PIR overflow bucket is updated and an exceed action is taken at 637. Otherwise a violate action is taken at 639. A violate action 639 may involve marking the packet color as red and/or dropping the packet.

If the packet is not yellow at 625, it is determined if the packet is red at 643. If the packet is red, conventional systems specify that a violate action should be applied to the packet. However, the techniques of the present invention recognize that a PIR overflow bucket at 645 should be checked to determine if excess credits were accumulated at PIR. If tokens are available in the PIR overflow bucket at 645, the PIR overflow bucket is updated and an exceed action is taken at 647. Consequently, taking the exceed action may promote the packet from red to yellow. If tokens are not available in the PIR overflow, a violate action is taken at 649. If the packet itself is not red, a colorblind operation is applied at 653.

Although the techniques and mechanisms of the present invention can be applied at a variety of network nodes, the techniques and mechanisms may be particularly applicable at edge routers. In one example, color based promotions may be particularly beneficial at edge routers where traffic from different subclasses is aggregated into a single class. Color based policing using overflow buckets can be applied to efficiently and effectively manage traffic forwarding.

Figure 7:
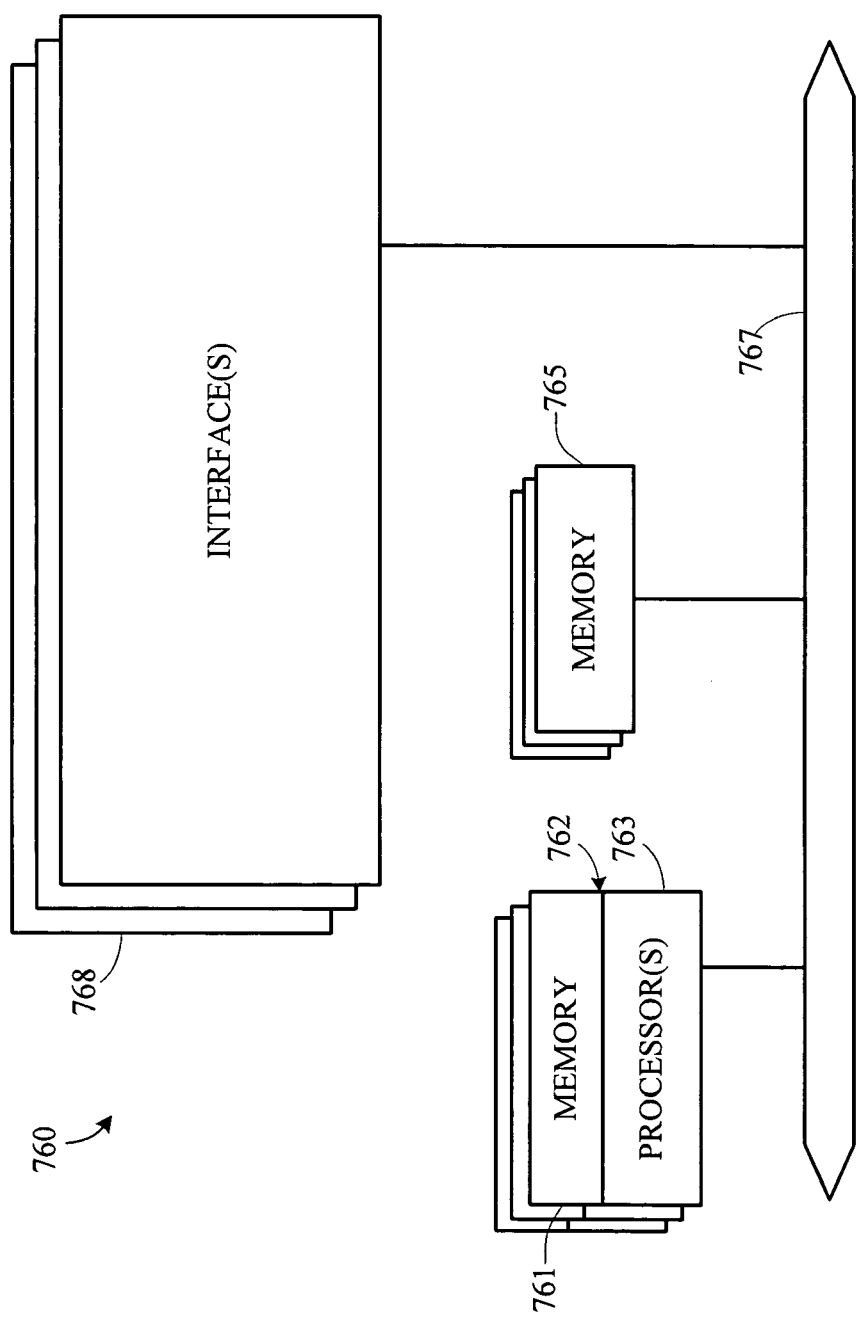
FIG. 7 is a diagrammatic representation showing a router.

FIG. 7 is a diagrammatic representation of one example of a network device 760 suitable for implementing the techniques of the present invention includes a master central processing unit (CPU) 762, interfaces 768, and a bus 767 (e.g., a PCI bus) or an interconnect. When acting under the control of appropriate software or firmware, the CPU 762 may be responsible for implementing specific functions associated with the functions of a desired network device. For example, the CPU 762 may be responsible for removing tags, determining services associated with tags, and replacing tags with other forms of header information. The CPU 762 preferably accomplishes all these functions under the control of software including an operating system, and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets over the network and sometimes support other peripherals used with the network device 760. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

A network device can include one or more memory modules (such as, for example, memory block 765) configured to store data, program instructions for the general-purpose network operations and/or other information relating to the functionality of the techniques described herein. The program instructions may control the operation of an operating system and/or one or more applications, for example. The memory or memories may also be configured to store data structures, mapping tables, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for policing traffic in a packet based network, the method comprising: receiving a packet at a router in the packet based network, the packet associated with a stream; identifying a color associated with the packet, the color corresponding to a policy applicable to the packet; determining whether excess bandwidth associated with the stream is available by using a plurality of buckets including a committed information rate (CIR) bucket, a CIR overflow bucket, a peak information rate (PIR) bucket, and a PIR overflow bucket; and changing the policy applicable to the packet to an updated policy using the plurality of buckets.

2. The method of claim 1, further comprising changing the color associated with the packet to an updated color associated with the updated policy.

3. The method of claim 1, wherein packet colors include red, yellow, and green.

4. The method of claim 3, wherein policies associated with the red, yellow, and green colors are violate, exceed, and conform policies respectively.

5. The method of claim 4, wherein packets marked red are dropped.

6. The method of claim 4, wherein packets marked yellow are transmitted at low priority.

7. The method of claim 4, wherein packets marked green are transmitted at high priority.

8. The method of claim 1, wherein determining that bandwidth associated with the stream is available comprises determining if tokens are available in the overflow bucket associated with the peak information rate (PIR) bucket.

9. The method of claim 8, wherein if the color associated with the packet is red and red corresponds to a violate policy applicable to the packet, the updated color and policy are yellow and exceed.

10. The method of claim 1, wherein determining that bandwidth associated with the stream is available comprises determining if tokens are available in the overflow bucket associated with the committed information rate (CIR) bucket.

11. The method of claim 10, wherein if the color associated with the packet is yellow and yellow corresponds to an exceed policy applicable to the packet, an updated color and policy are green and conform.

12. The method of claim 1, wherein the updated policy is provided at an edge router.

13. A router for policing traffic in a packet based network, the router comprising: an interface configured to receive a packet associated with a stream; a processor configured to identify a color associated with the packet, the color corresponding to a policy applicable to the packet and determine whether excess bandwidth associated with the stream is available by using a plurality of buckets including a committed information rate (CIR) bucket, a CIR overflow bucket, a peak information rate (PIR) bucket, and a PIR overflow bucket, wherein the processor is further configured to change the policy applicable to the packet to an updated policy using the plurality of buckets.

14. The router of claim 13, wherein the processor is further configured to change the color associated with the packet to an updated color associated with the updated policy.

15. The router of claim 13, wherein packet colors include red, yellow, and green.

16. The router of claim 15, wherein policies associated with the red, yellow, and green colors are violate, exceed, and conform policies respectively.

17. The router of claim 16, wherein packets marked red are dropped.

18. The router of claim 16, wherein packets marked yellow are transmitted at low priority.

19. The router of claim 16, wherein packets marked green are transmitted at high priority.

20. The router of claim 13, wherein determining that bandwidth associated with the stream is available comprises determining if tokens are available in the overflow bucket associated with the peak information rate (PIR) bucket.

21. The router of claim 20, wherein if the color associated with the packet is red and red corresponds to a violate policy applicable to the packet, the updated color and policy are yellow and exceed.

22. The router of claim 13, wherein determining that bandwidth associated with the stream is available comprises determining if tokens are available in the overflow bucket associated with the committed information rate (CIR) bucket.

23. The router of claim 22, wherein if the color associated with the packet is yellow and yellow corresponds to an exceed policy applicable to the packet, an updated color and policy are green and conform.

24. The router of claim 13, wherein the updated policy is provided at an edge router.

25. A system for policing traffic in a packet based network, the system comprising: means for receiving a packet at a router in the packet based network, the packet associated with a stream; means for identifying a color associated with the packet, the color corresponding to a policy applicable to the packet; means for determining whether excess bandwidth associated with the stream is available by using a plurality of buckets including a committed information rate (CIR) bucket, a CIR overflow bucket, a peak information rate (PIR) bucket, and a PIR overflow bucket; and means for changing the policy applicable to the packet to an updated policy using the plurality of buckets.

26. The system of claim 25, further comprising changing the color associated with the packet to an updated color associated with the updated policy 27. The system of claim 25, wherein packet colors include red, yellow, and green.

28. The system of claim 27, wherein policies associated with the red, yellow, and green colors are violate, exceed, and conform policies respectively.

29. The system of claim 28, wherein packets marked red are dropped.

30. A tangible computer readable medium including computer code for policing traffic in a packet based network, the computer readable medium comprising: computer code for receiving a packet at a router in the packet based network, the packet associated with a stream; computer code for identifying a color associated with the packet, the color corresponding to a policy applicable to the packet; computer code for determining whether excess bandwidth associated with the stream is available by using a plurality of buckets including a committed information rate (CIR) bucket, a CIR overflow bucket, a peak information rate (PIR) bucket, and a PIR overflow bucket; and computer code for changing the policy applicable to the packet to an updated policy using the plurality of buckets.

* * * * *